United States Patent [19]
Tomura et al.

[11] Patent Number: 5,256,955
[45] Date of Patent: Oct. 26, 1993

[54] HOUSEHOLD AND ONBOARD VEHICLE POWER OUTLET-BASED BATTERY CHARGER FOR PORTABLE TELEPHONE

[75] Inventors: Masashi Tomura; Tatsuzi Shigeta, both of Kawasaki, Japan

[73] Assignee: Fujitsu Limited, Kawasaki, Japan

[21] Appl. No.: 967,378

[22] Filed: Oct. 28, 1992

[30] Foreign Application Priority Data

Oct. 30, 1991 [JP] Japan .................. 3-284889

[51] Int. Cl.⁵ .................. H02J 7/00; H01M 10/46
[52] U.S. Cl. .................. 320/2; 320/15
[58] Field of Search .................. 320/2, 15

[56] References Cited

U.S. PATENT DOCUMENTS

| | | | |
|---|---|---|---|
| 5,028,859 | 7/1991 | Johnson et al. | 320/2 X |
| 5,052,943 | 10/1991 | Davis | 320/2 X |
| 5,162,719 | 11/1992 | Tomura et al. | 320/2 |
| 5,189,358 | 2/1993 | Tomura et al. | 320/2 |

FOREIGN PATENT DOCUMENTS 61-30851 2/1986 Japan.
4-20156 1/1992 Japan.

Primary Examiner—R. J. Hickey
Attorney, Agent, or Firm—Armstrong, Westerman, Hattori, McLeland & Naughton

[57] ABSTRACT

A battery charger for use with a portable telephone set and capable of charging both a battery pack mounted on the telephone set and a battery pack as a discrete unit. The case of the battery charger comprises a concave portion on the top thereof, a first convex portion at one end of the top and a second convex portion at the other end of the top. The concave portion of the top engages with a convex portion of the first battery pack. The first convex portion engages with a concave portion of the portable telephone set. The second convex portion engages with a concave portion common to the first battery pack and the second battery pack. Inside the case is a printed circuit board having charging circuits. A pair of charging terminals electrically connected to the charging circuits protrude from the case top. The battery charger further includes a battery pack holder removably attached to the case, the holder holding the battery pack from above to prevent its dislodging from the case.

6 Claims, 17 Drawing Sheets

HOUSEHOLD AND ONBOARD VEHICLE POWER OUTLET-BASED BATTERY CHARGER FOR PORTABLE TELEPHONE

BACKGROUND OF THE INVENTION

1. Field of the Invention

The present invention relates to structural improvements in a battery charger for use with portable telephone and, more particularly, to structural improvements in a battery charger which may tap both household and onboard vehicle power outlets and which is used in conjunction with portable telephone.

2. Description of the Related Art

The ultimate objective of communication is obviously to transmit or exchange ideas and information to or with anyone or any entity wherever and whenever desired. That objective has been pursued traditionally by capabilities of communication between fixed points and more recently by means of mobile communication. Mobile communication refers to the communication between fixed-point subscriber and business telephone sets on the one hand, and such mobile entities as vessels, vehicles, aircraft and the people on board these means of transportation. Recent years have seen the appreciable growth in the field of portable telephone, one of the preferred modes of mobile communication.

Portable communication equipment including portable telephone sets operates generally on batteries which are charged by battery chargers. Because of their use in conjunction with the portable equipment, the battery chargers should preferably tap both the commercial household power outlet and the onboard vehicle battery outlet.

Traditionally, the household outlet-based battery charger and the onboard vehicle power outlet-based battery charger have been manufactured as separate devices. The primary reason for this is that the battery charger for use on board the vehicle, requiring various protective circuits for protecting the device from such severe ambient conditions as vibration, is too expensive for parallel use with the household outlet.

FIG. 1 is a perspective view of the prior art household outlet-based battery charger proposed by this applicant, the charger being shown to accommodate a portable telephone set and its backup battery pack. In FIG. 1, a household outlet-based battery charger 1 has a prop-up side 8 against which a portable telephone set is placed at a predetermined angle relative to the perpendicular direction. The battery charger 1 also has a concave portion 9 in which to insert the backup battery pack. Reference numeral 6 is a portable telephone set equipped with the battery pack. To be charged, the portable telephone set 6 is propped against the prop-up side 8 of the battery charger 1 as indicated by arrow A. The backup battery back 7 is inserted in the concave portion 9 as indicated by arrow B while being charged. At one end of a cord 2 is a connector 5 that attaches to the battery charger 1. The other end of the cord 2 is equipped with an AC/DC adapter that is plugged into a commercial household outlet 4. In this manner, the battery charger 1 charges both the portable telephone set 6 and its backup battery pack 7 at the same time.

Unlike onboard vehicle power outlet-based battery chargers, the household outlet-based battery charger generally is not subject to vibration. It follows that no special structure is needed to keep the portable telephone set and its battery pack in place during charging. For this reason, in the prior art charger structure, the portable telephone set is simply propped against the prop-up side of the charger and the battery pack inserted where designated, as illustrated in FIG. 1. The battery charger of this type is not suitable for use on board the vehicle for reasons primarily attributable to the vibration and impact from the running vehicle. One reason for inappropriateness for onboard use is that the vibration or impact may dislodge the portable telephone set and its battery pack from the battery charger and cause poor or disrupted connections of charge-related terminals, making the charging operation impossible. Another reason is that the vibration or impact may erroneously reset the battery charger, causing the battery to be overcharged and bringing it to a premature end of its service life.

SUMMARY OF THE INVENTION

It is therefore an object of the present invention to provide a battery charger structured in such a manner that it may tap both household and onboard vehicle power outlets for charging a battery pack housed in a portable telephone set as well as a separate backup battery back in an easy and reliable manner.

In accordance with an aspect of the present invention, there is provided a battery charger for use with a portable telephone set and for charging a first battery pack of a large capacity and a second battery pack of a small capacity used by the portable telephone set, the first battery pack having a convex portion at the bottom thereof, the portable telephone set having a concave portion at one end thereof, the first battery pack and the second battery pack each having a concave portion common to the two packs, the battery charger comprising: a case having a concave portion on the top thereof, a first convex portion at one end of the top and a second convex portion at the other end of the top, the concave portion of the top being structured to engage with the convex portion of the first battery pack, the first convex portion being structured to engage with the concave portion of the portable telephone set, the second convex portion being structured to engage with the common concave portion of the first battery pack and the second battery pack; a printed circuit board included in the case and containing charging circuits; a pair of charging terminals projecting from the top of the case and connected to the charging circuits of the printed circuit board; and a battery pack holder removably attached to the case to hold from above any one of the first battery pack and the second battery pack selectively mounted on the case in order to keep the selected battery pack in place.

The concave portion at the case top engages with the convex portion of the first battery pack of large capacity. This makes it possible for both the first battery pack of large capacity and the second battery pack of small capacity to be charged by the same battery charger. In addition, the first convex portion of the case engages with the concave portion of the portable telephone set, while the second convex portion of the case, a dual type convex portion, engages with the concave portion common to the first and the second battery packs. The structure allows the portable telephone set to be secured in a simple manner during charging. That is, the portable telephone set will not be dislodged or disconnected from the charging terminals of the charger as a result of the pressure from the terminals.

The battery pack holder mounted on the case keeps the battery pack in place by pressing it downward. Thus the battery charger according to the invention also charges batter pack as a discrete unit.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

Figure 1:
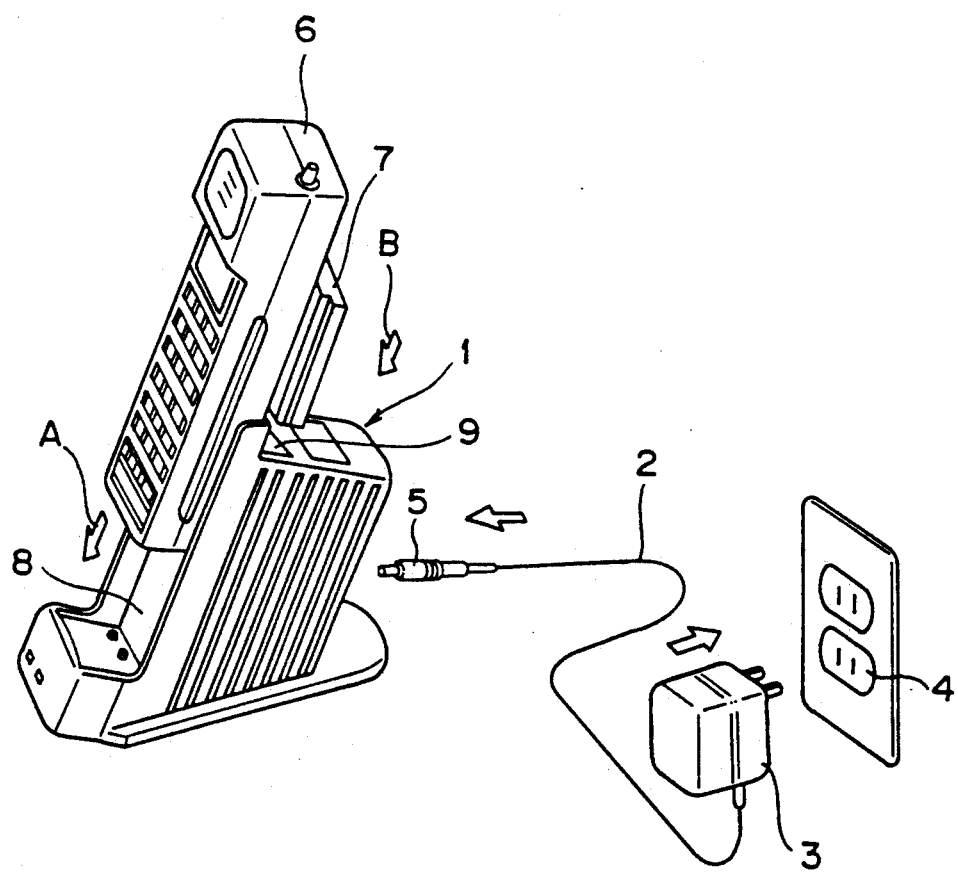
FIG. 1 is a perspective view of a typical prior art battery changer for use with a portable telephone set.
Figure 2:
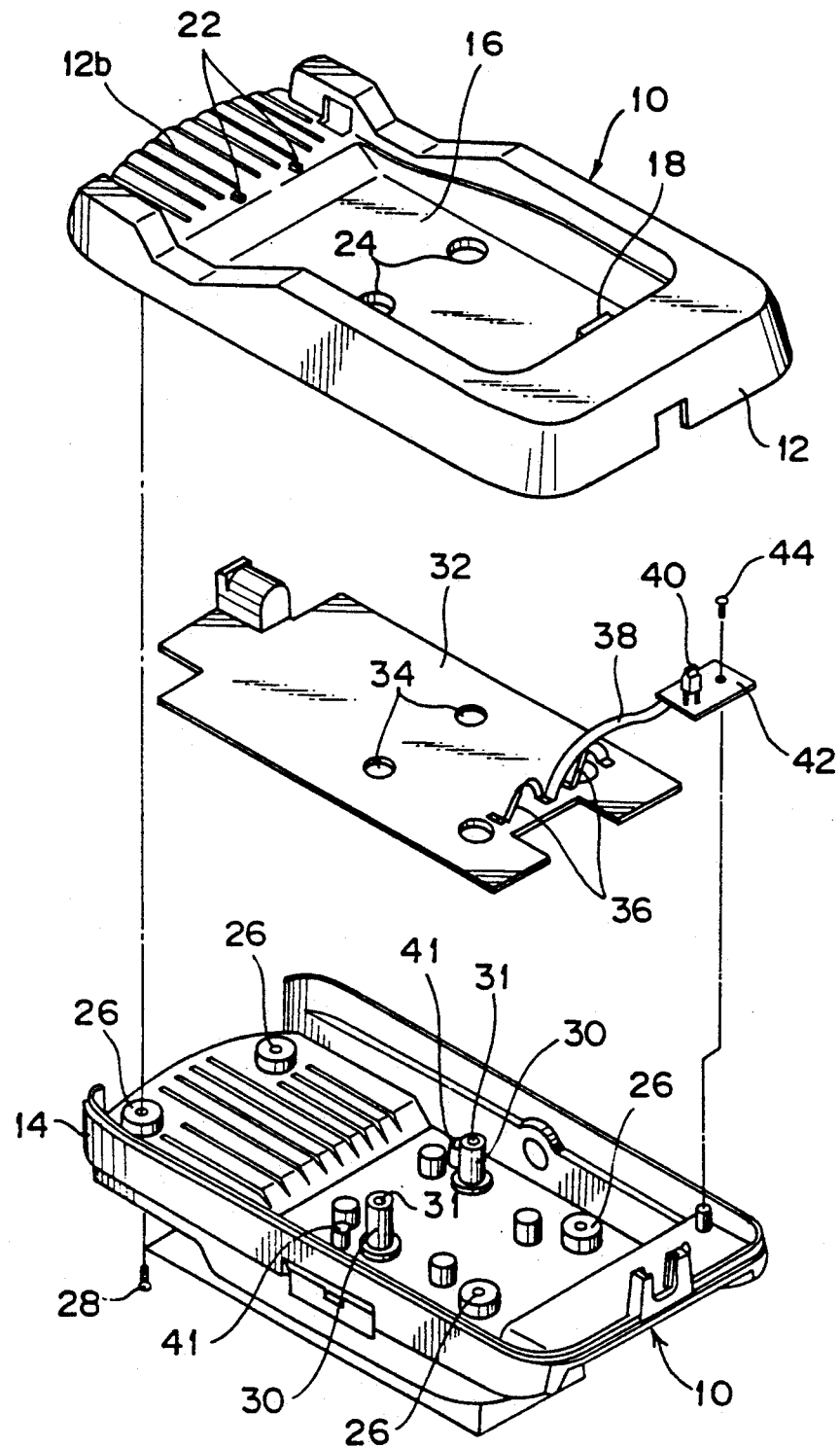
FIG. 2 is an exploded view of a battery charger practiced as a first embodiment of the invention.
Figure 3:
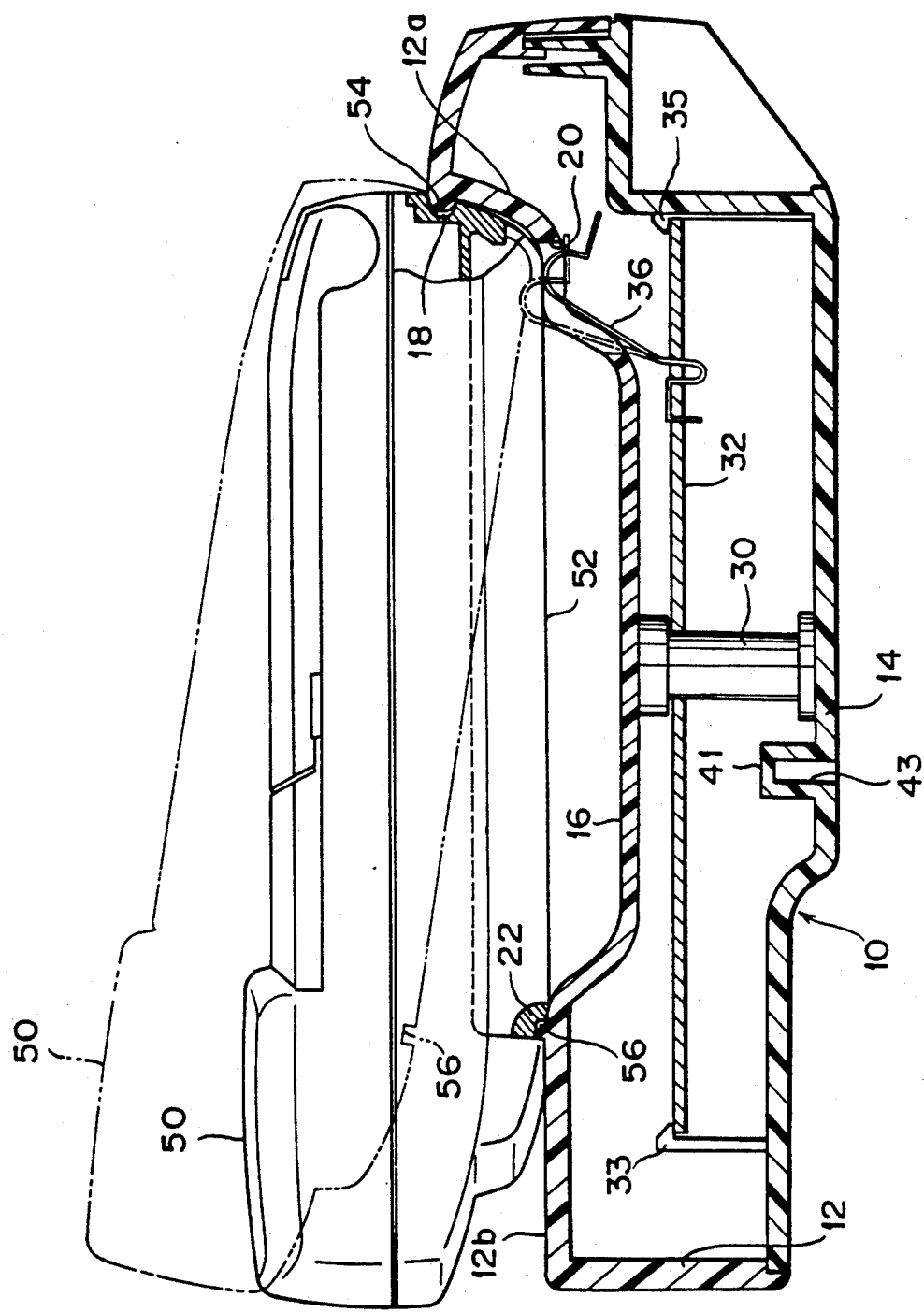
FIG. 3 is a cross-sectional view of the first embodiment of FIG. 2 as it is loaded with a small-capacity battery pack.
Figure 4:
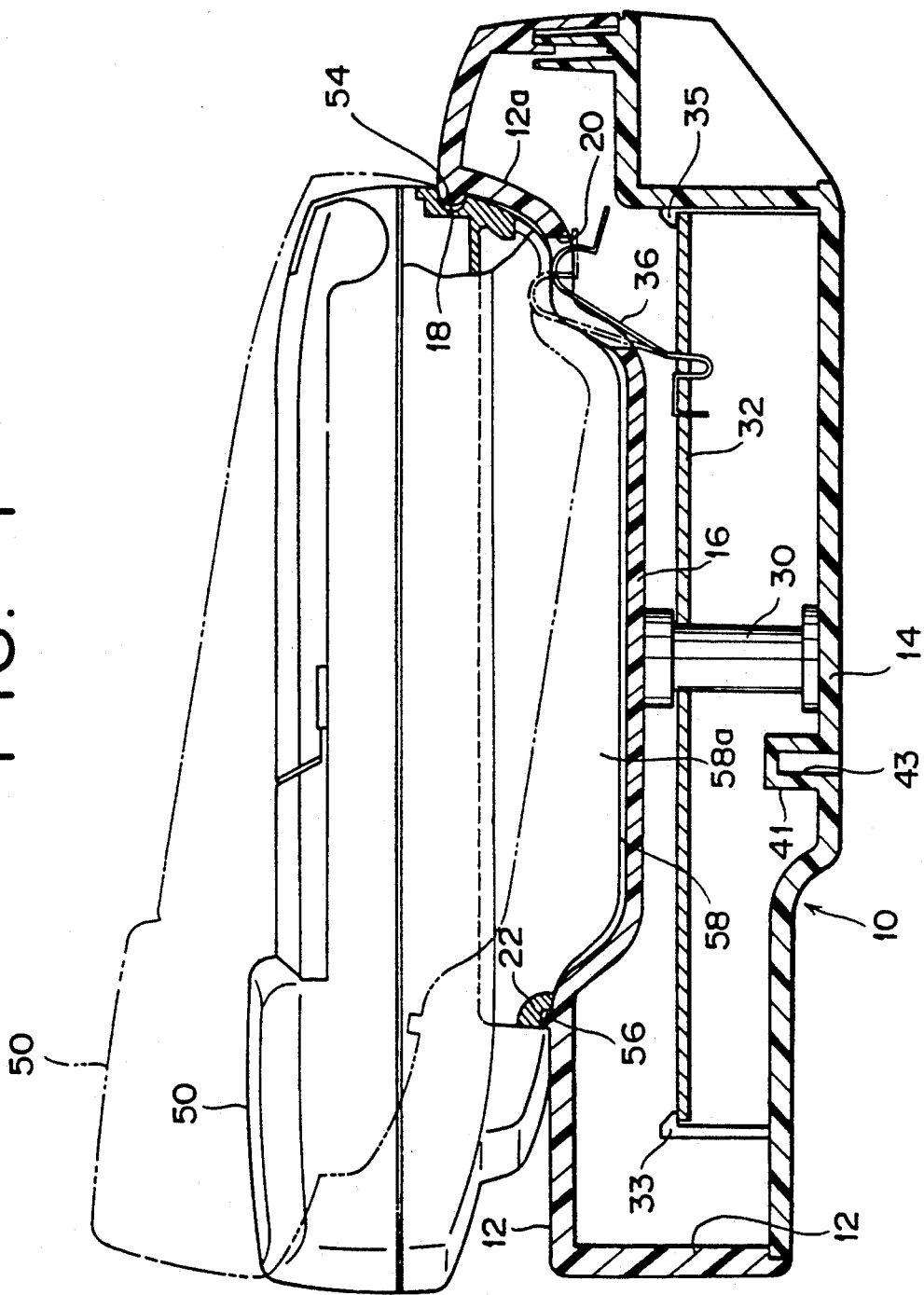
FIG. 4 is a cross-sectional view of the first embodiment as it is loaded with a large-capacity battery pack.

Preferred embodiments of the invention will now be described with reference to the accompanying drawings. FIG. 2 is an exploded view of the first embodiment of the invention, FIG. 3 is a cross-sectional view of the first embodiment with a small-capacity battery pack loaded in it, and FIG. 4 is a cross-sectional view of the first embodiment loaded with a large-capacity battery pack.

As best shown in FIG. 2, the case of a battery charger 10 comprises an upper case 12 and a lower case 14. At the top of the upper case 12 is a concave portion 16 that engages with a convex portion of a large-capacity battery pack. As also shown in FIGS. 3 and 4, at the top rear end 12a of the upper case 12 is a convex portion 18 that engages with a concave portion of a portable telephone set. At the flat-shaped top front end 12b of the upper case 12 are a pair of convex portions 22 that engage with the concave portion common to both the large- and small-capacity battery packs. In addition, a pair of holes 24 are provided at the bottom of a depression 16 of the upper case 12.

The lower case 14 has four fixed bosses 26 with a fixed hole each. Screws 28 driven into the fixed holes of the bosses 26 integrally secure the lower case 14 to the upper case 12. A pair of bosses 30 having a hole 31 each are integrally formed in the approximate middle of the lower case 14.

Reference numeral 32 is a printed circuit board containing charging circuits and provided with a pair of holes 34 in which to insert the bosses 30. Charging terminals 36 are fixedly mounted on the printed circuit board 32. Made of an elastic material, the charging terminals 36 protrude into the depression 16 through an opening 20 formed on the upper case 12. When a portable telephone set is placed in the depression 16, the charging terminals 36 come into contact with their counterparts of the battery pack contained in the telephone set. The contact of the terminals enables the battery pack to be charged.

Reference numeral 40 is an indicator lamp such as an LED connected to the printed circuit board 32 with a cord 38. The indicator lamp 40 is mounted on a printed circuit board 42 which in turn is secured with a screw 44 to the lower case 14. As indicated in FIGS. 3 and 4, the printed circuit board 32 is secured within the case by engagement with pawls 33 and 35 of the lower case 14.

Described below with reference to FIGS. 3 and 4 is how the small-capacity battery pack in a portable telephone set 50 and a large-capacity battery pack 58 are charged by the battery charger 10 embodying the invention.

FIG. 3 shows how the portable telephone set 50 is loaded with the small-capacity battery pack 52. The concave portion 54 of the portable telephone set 50 engages with the convex portion 18 at the top rear end of the battery charger 10. The concave portion 56 of the small-capacity battery pack 52 engages with the pair of convex portions 22 at the top front end of the battery charger 10. In this manner, the portable telephone set 50 is loaded onto the battery charger 10.

On the battery charger 10, the small-capacity battery pack 52 does not engage with the depression 16 at the top of the charger 10. Instead, the bottom of the small-capacity battery pack 52 comes into contact in a substantially flat manner with the flat-shaped top front end 12b of the upper case 12. When the portable telephone set 50 is mounted on the battery charger 10, the charging terminals 36 of the charger 10 are elastically deformed to make pressed contact with the charging terminals of the battery pack 52. The contact of the charging terminals allows the small-capacity battery pack 52 in the portable telephone set 50 to be charged.

While the elastically deformed charging terminals 36 exert pressure onto the portable telephone set 50, the convex portion 18 engages with the concave portion 54 of the telephone set 50 and the convex portions 22 with the concave portion 56 of the small-capacity battery pack 52. This keeps the portable telephone set 50 in place on the battery charger 10 despite the elastically exerted pressure from the charging terminals 36.

FIG. 4 illustrates how the portable telephone set 50 equipped with the large-capacity battery pack 58 is mounted on the battery charger 10 for charging of the battery pack 58. The portable telephone set 50 is mounted in place on the battery charger 10 with a bulging portion 58a of the large-capacity battery pack 58 fit into the depression 16 of the charger 10.

The large-capacity battery pack 58 has its concave portion 56 formed in about the same position as the small-capacity battery pack 52. When the convex portion 22 of the battery charger 10 engages with the concave portion 56 and the convex portion 18 with the concave portion 54 of the portable telephone set 50, the telephone set 50 is secured in a simple manner to the battery charger 10.

The above-described battery charger, if unmodified, will not accommodate as a discrete unit the small-capacity battery pack 52 or large-capacity battery pack 58 for charging. This is because the elastically exerted force of the charging terminals 36 lifts the battery pack 52 or 58 from its charging position, making it impossible to charge the battery pack as a discrete unit detached from the portable telephone set 50. This apparent disadvantage is bypassed by attaching a simplified component to the first embodiment above. The modified embodiment allows the battery pack to be charged both as a discrete unit and as an attachment to the portable telephone set.

Figure 5:
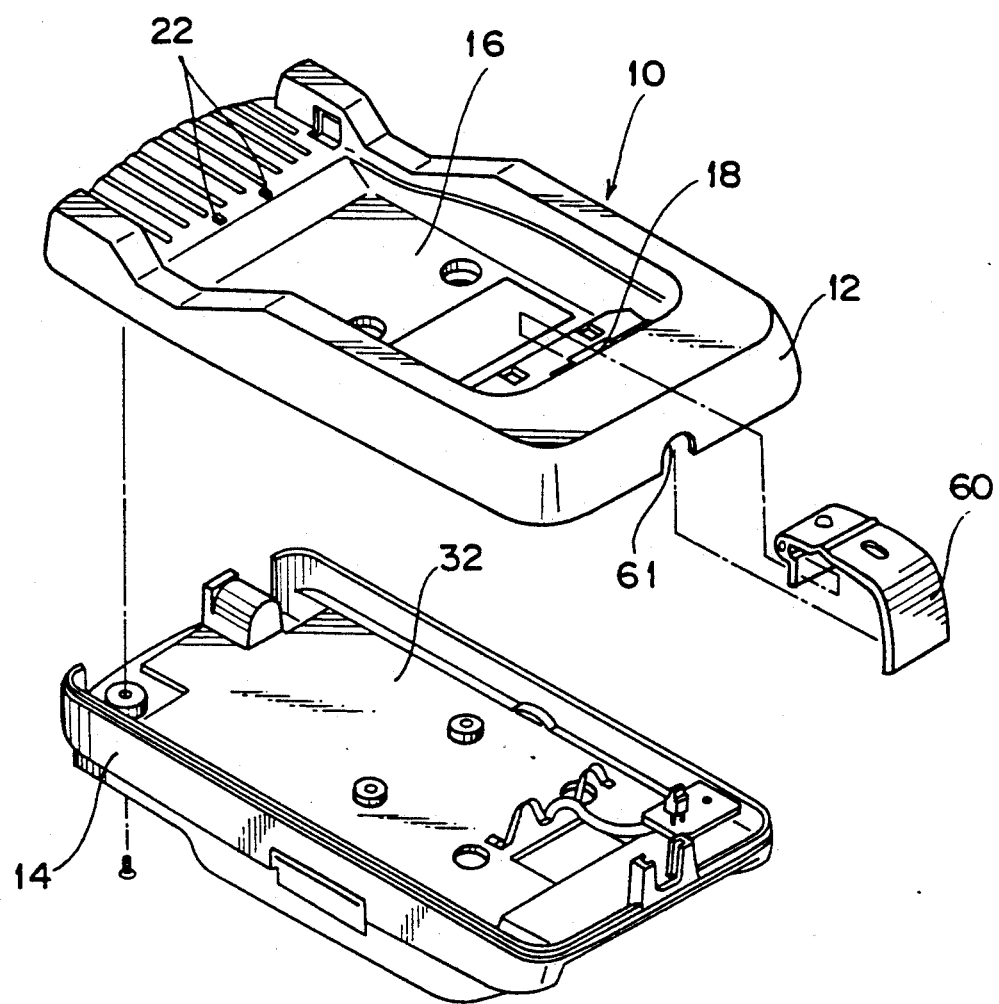
FIG. 5 is an exploded view of the first embodiment as it is equipped with a battery pack holder.
Figure 6A:
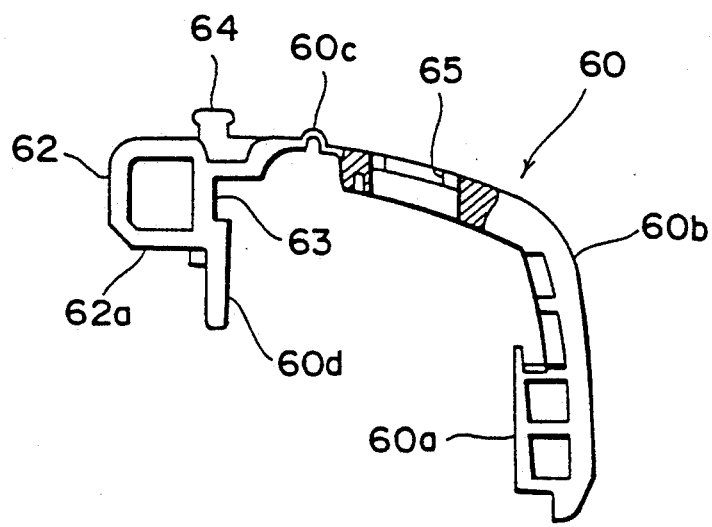
FIG. 6A is a partial cross-sectional view of the battery pack holder of FIG. 5.
Figure 6B:
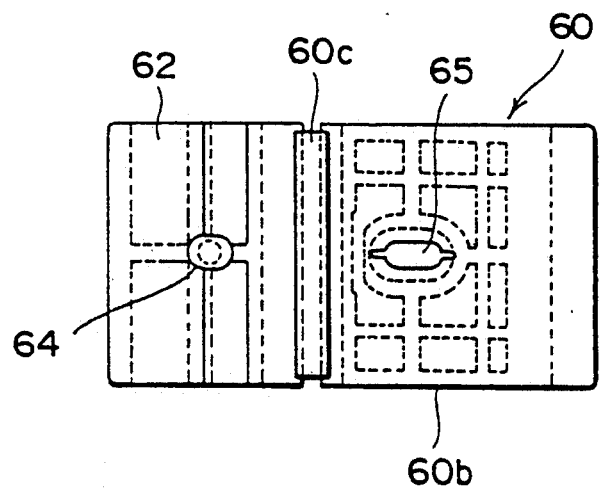
FIG. 6B is a plan view of the battery pack holder.
Figure 7:
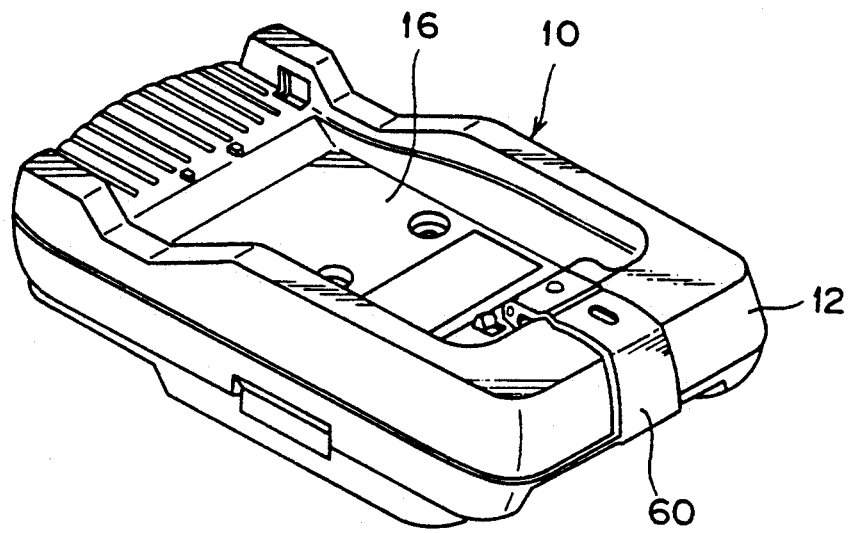
FIG. 7 is a perspective view of the first embodiment as it is equipped with the battery pack holder.

Described below with reference to FIGS. 5 through 12 is a battery pack holder which, when attached to the first embodiment, allows the battery pack to be charged as a discrete unit. In FIG. 5, reference numeral 60 is a battery pack holder whose mounting portion (i.e., collar) engages with a hole 61 formed on the upper case 12. A curled cord is threaded through the hole 61. When mounted on the upper case 12, the battery pack holder 60 appears as shown in FIG. 7.

FIGS. 6A and 6B are a partial cross-sectional view and a plan view of the battery pack holder 60, respectively. The battery pack holder 60 comprises a collar 60a that engages with the hole 61 of the upper case 12, a body portion 60b which is shaped to follow the cross-sectional contour of that position of the upper case 12 in which the battery pack holder 60 is mounted, a hinge 60c that is a continuation of the body portion 60b, a concave portion 63 that engages with a first convex portion 18 of the upper case 12, and a holding portion 62 that holds the battery pack in place. Furthermore, the battery pack holder 60 has a flat portion 60d that is a continuation of the concave portion 63, a projection 64 that secures the battery pack holder 60 in inactive position, and a hole 65 formed on the body portion 60b to engage with the projection 64.

The battery pack holder 60 is made of a thermoplastic resin such as polypropylene. The hinge 60c is of an arc shape that allows the concave portion 63 to climb over the convex portion 18 of the upper case 12 for engagement with that portion 18. The hinge 60c is durable enough to withstand the bending motion that may be repeated up to about fifty thousands times. The holding portion 62 has a holding surface 62a that holds from above the battery pack in place.

Figure 8:
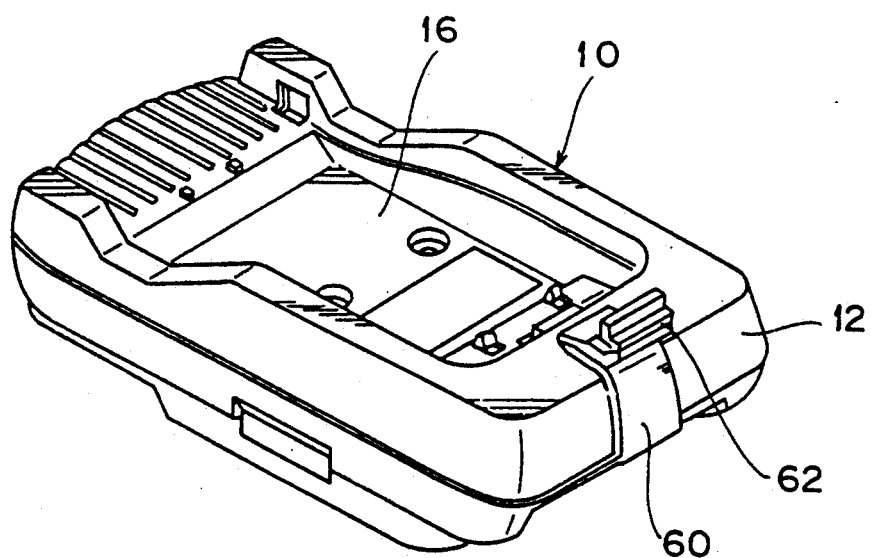
FIG. 8 is a perspective view of the first embodiment with its battery pack holder rendered inactive.

FIG. 7 depicts how the battery pack holder 60 is attached to the battery charger 10, and FIG. 8 illustrates how the battery pack holder 60 is bent around the hinge 60c to let the projection 64 engage with the hole 65 so that the battery pack holder 60 is kept inactive. It is in the above state that the small-capacity battery pack 52 in the portable telephone set 50 or the large-capacity battery pack 58 is charged by the battery charger 10.

Figure 9:
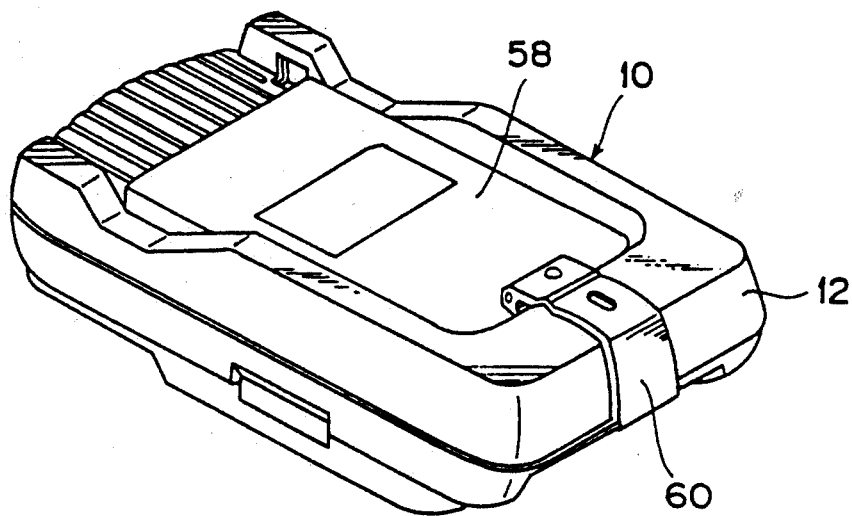
FIG. 9 is a perspective view of the first embodiment as it is loaded with a battery pack.
Figure 11:
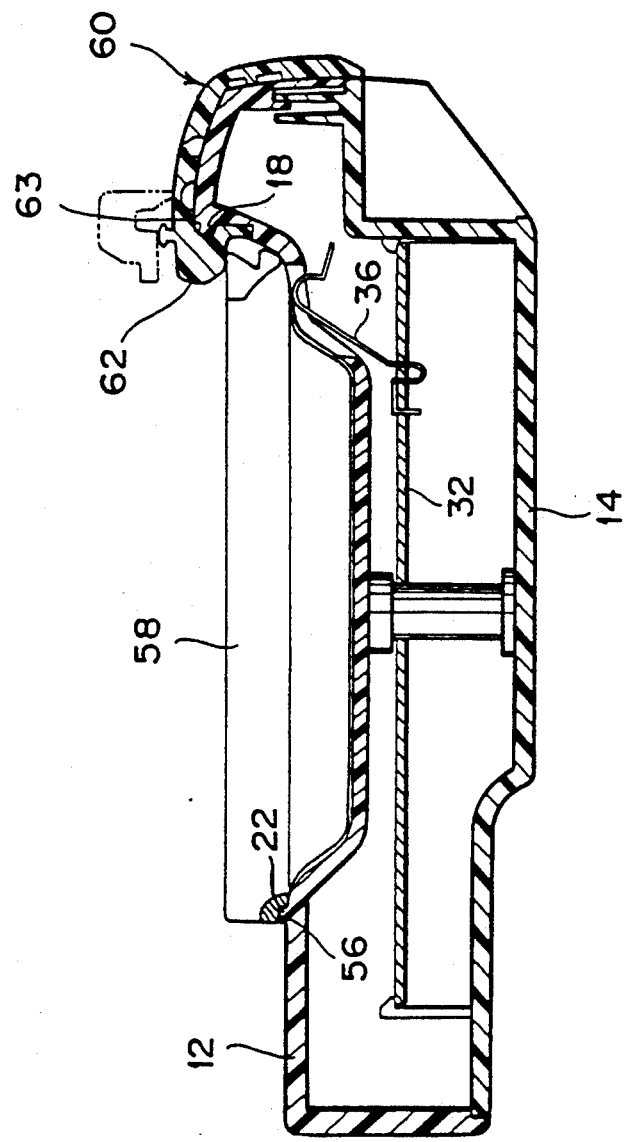
FIG. 11 is a cross-sectional view of the first embodiment as it is loaded with a battery pack.

FIG. 9 is a perspective view of the first embodiment as it is loaded with the large-capacity battery pack 58, and FIG. 11 is a cross-sectional view of the first embodiment combined with its battery pack 58. As best shown in FIG. 11, the large-capacity battery pack 58 is mounted on the battery charger 10 so that the concave portion 63 of the battery pack holder 60 will engage with the convex portion 18 of the upper case 12 and that the convex portion 22 will engage with the concave portion 56 of the battery pack 58. This causes the holding surface 62a of the holding portion 62 to keep from above the large-capacity battery pack 58 in place. The resulting pressure from the charging terminals 36 prevents the large-capacity battery pack 58 from lifting up to dislodge, allowing the battery pack 50 to be charged reliably. The same workings of the above structure also apply to the small-capacity battery pack 52.

Figure 10:
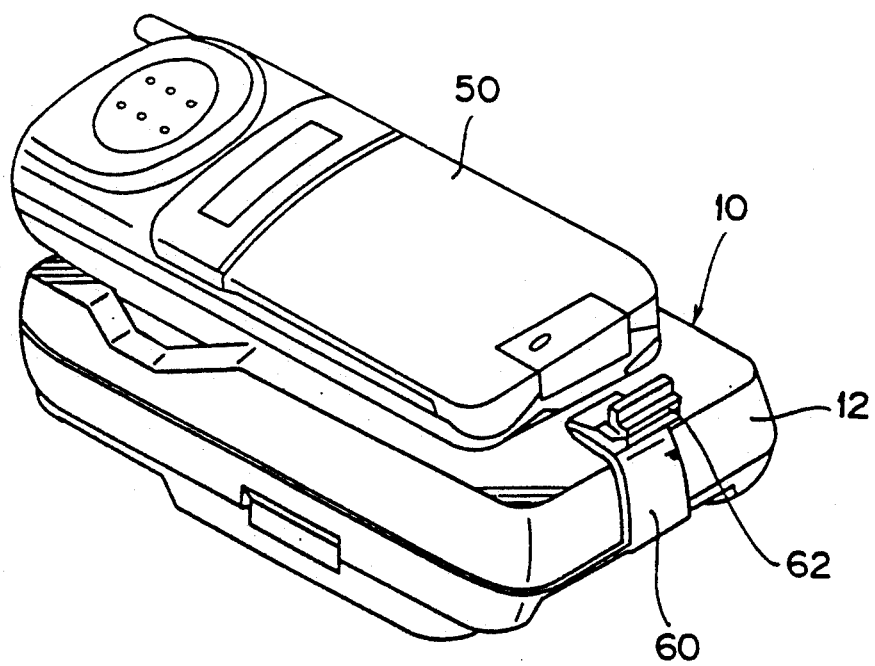
FIG. 10 is a perspective view of the first embodiment as it is loaded with a portable telephone set.
Figure 12:
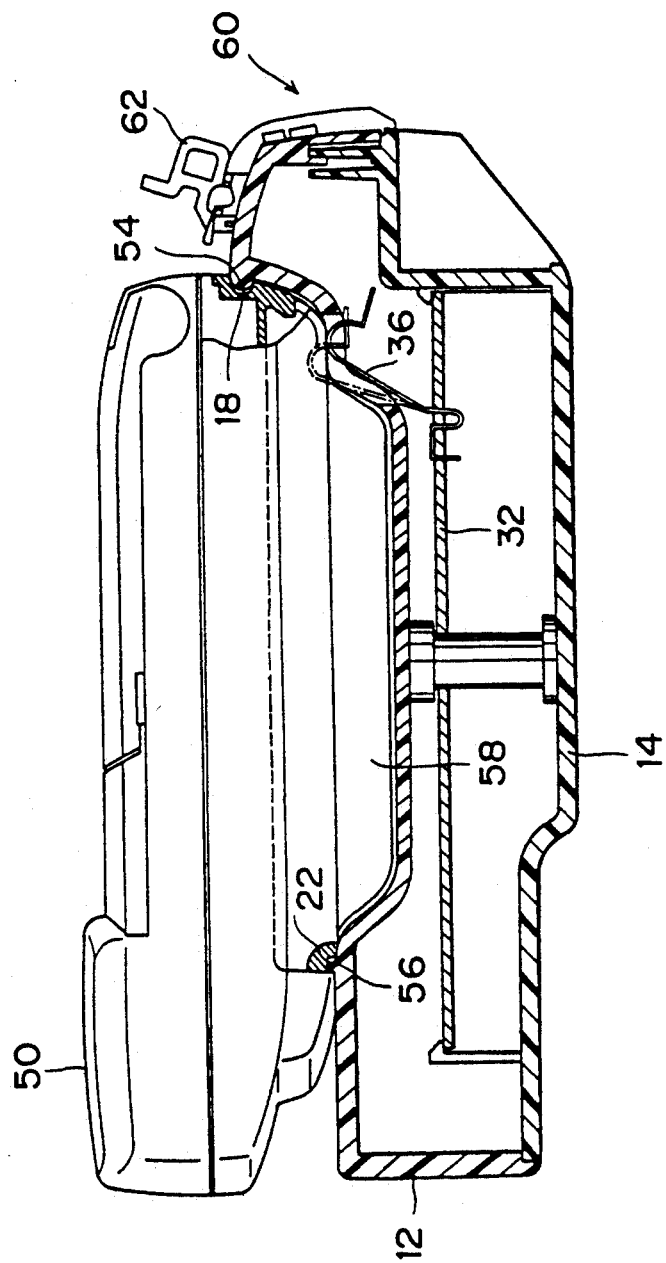
FIG. 12 is a cross-sectional view of the first embodiment as it is loaded with a portable telephone set.

FIG. 10 is a perspective view showing how the large-capacity battery pack 58 loaded in the portable telephone set 50 is charged by the battery charger 10, and FIG. 12 is a cross-sectional view of the setup of FIG. 10. In this case, the battery pack holder 60 is bent at the hinge 60c to let the projection 64 engage with the hole 65, whereby the battery pack holder 60 is kept inactive as shown in FIG. 12. This makes it possible to charge the large-capacity battery pack 58 contained in the portable telephone set 50 in the same manner as with the setup of FIG. 4.

The battery pack holder 60 snaps into the upper case 12. When the battery pack alone is to be charged, the battery pack is held in place from above by the holding portion 62, as illustrated in FIGS. 9 and 11. Where the battery pack holder 60 is not needed, the holder 60 is kept inactive as depicted in FIGS. 10 and 12. Because the battery pack holder 60 can be used as mounted on the battery charger 10, there is little possibility of the holder 60 getting lost or misplaced.

Figure 13:
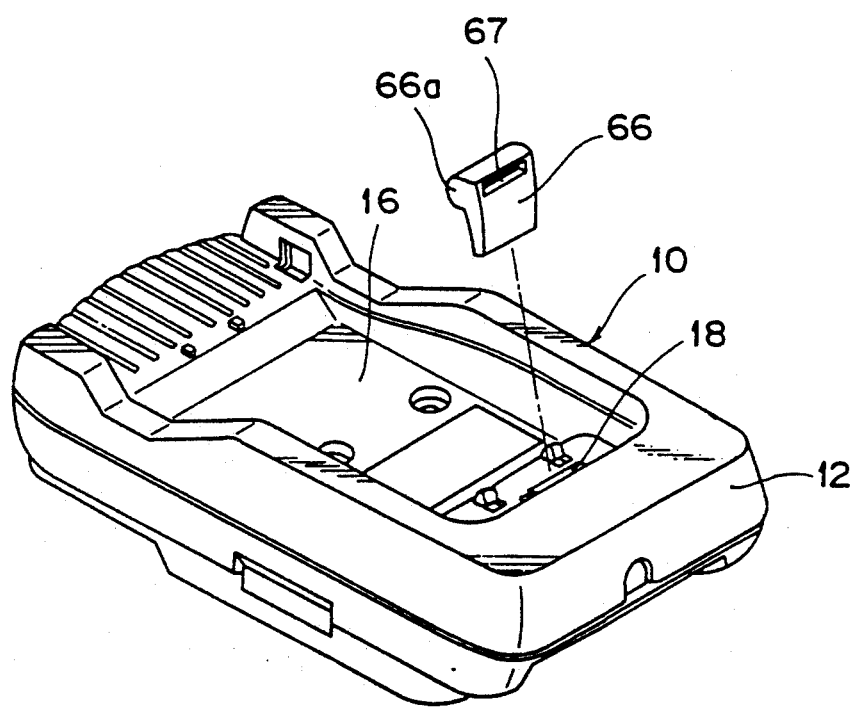
FIG. 13 is an exploded view of a second embodiment of the invention as it is equipped with a battery pack holder.

FIG. 13 is an exploded view of the second embodiment of the invention as it is equipped with a battery pack holder 66. The battery pack holder 66 has a holding portion 66a and a concave portion 67 that engages with the convex portion 18 of the upper case 12. With the concave portion 67 engaging with the convex portion 18 of the upper case 12, the battery pack holder 66 attaches to the battery charger 10. The small-capacity battery pack 52 or large-capacity battery pack 58 mounted on the battery charger 10 is held in place by the holding portion 66a during charging.

Although the battery pack holder 66 is very simple in structure, it must be detached from the battery charger 10 when not used. Thus there exists a possibility that the detached battery pack holder 66 may get lost or misplaced.

Figure 14:
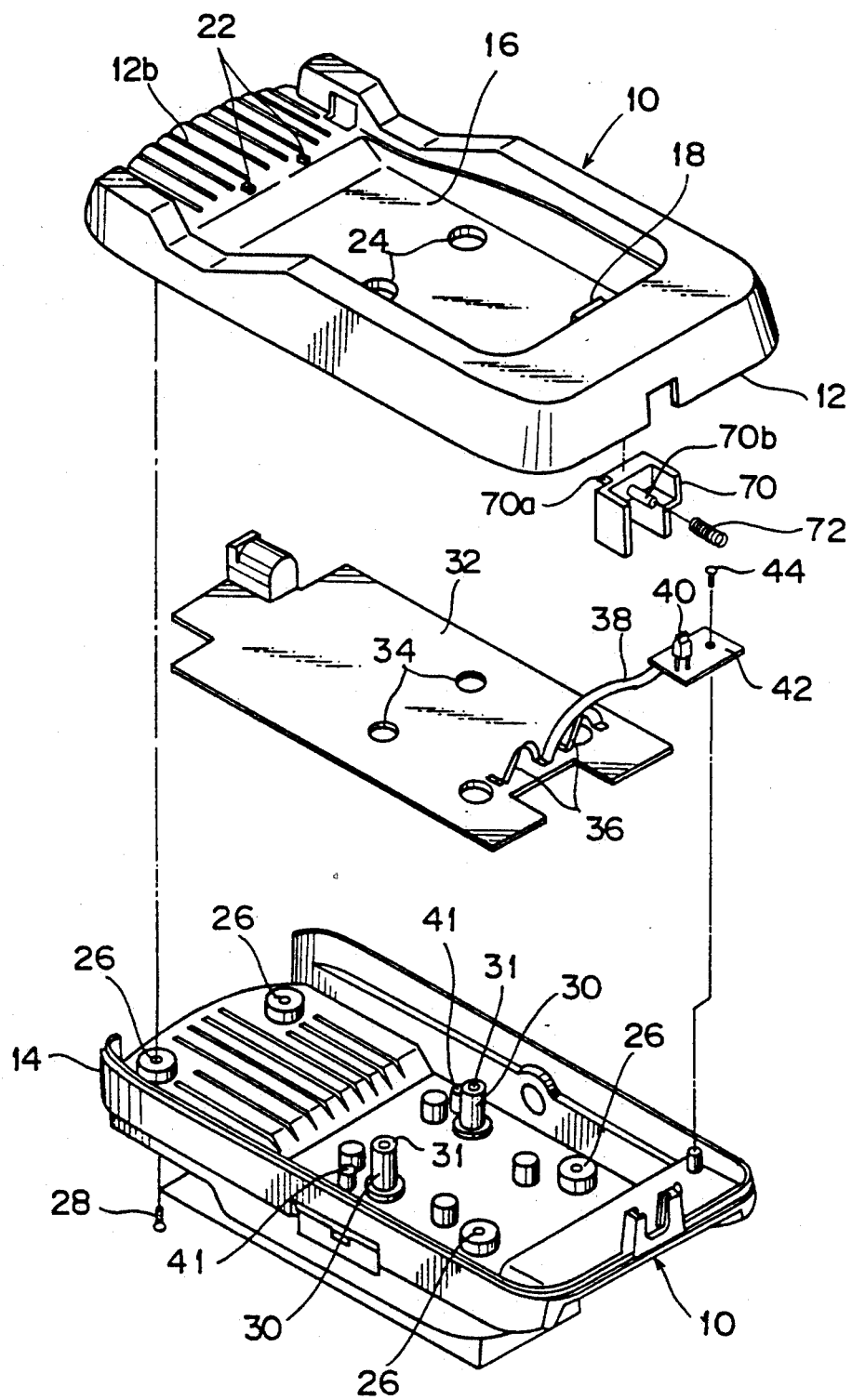
FIG. 14 is an exploded view of a third embodiment of the invention as it is equipped with a battery pack holder.

FIG. 14 is an exploded view of the third embodiment of the invention as it is equipped with a battery pack holder 70. This embodiment is the same in structure as the first embodiment of FIG. 2 except for the battery pack holder 70. Thus between the two embodiments, like reference characters designate like or corresponding parts, and any repetitive descriptions of the parts in the third embodiment are abbreviated.

Figure 16:
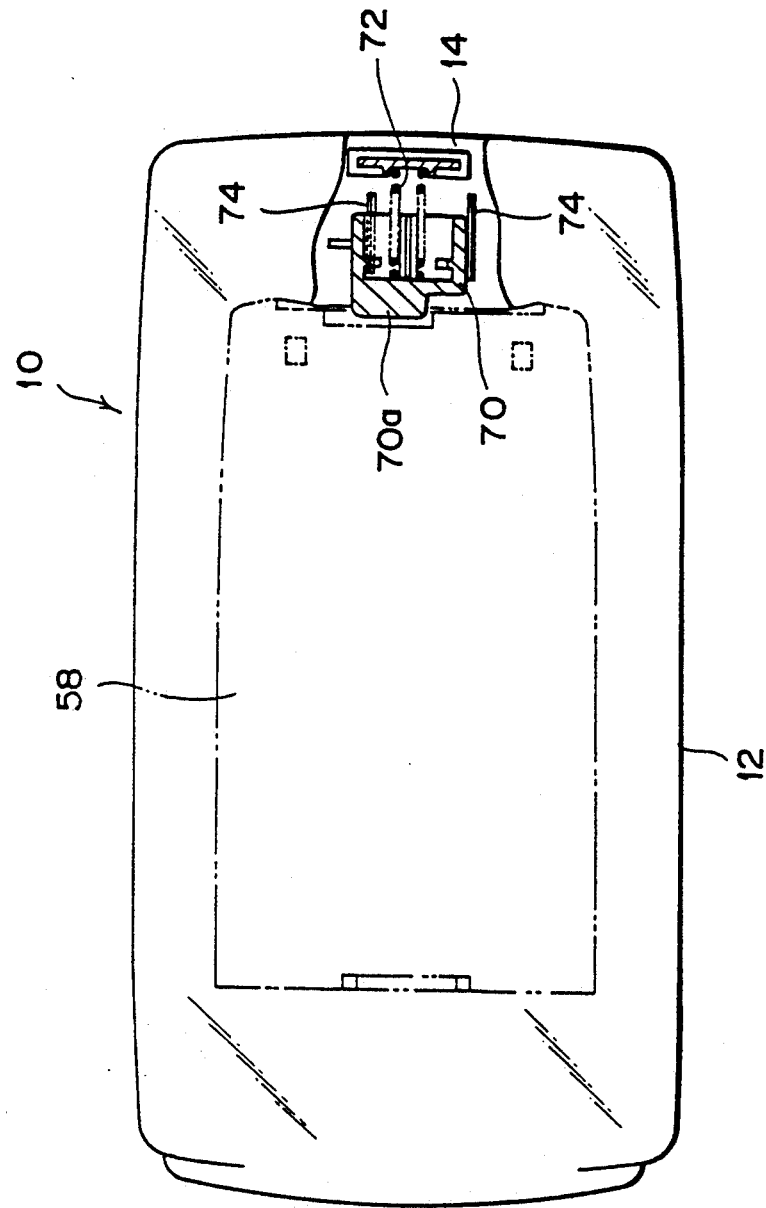
FIG. 16 is a partially broken plan view of the third embodiment of FIG. 15.

The battery pack holder 70 has a pawl 70a integrally formed thereon and includes a guide pin 70b onto which to insert a coil spring 72, the guide pin 70b being formed at approximately the same height as the pawl 70a. As shown in FIG. 16, the lower case 14 has a pair of guide rails 74 that keep the relocation of the battery pack holder 70 in a fixed direction.

Figure 15:
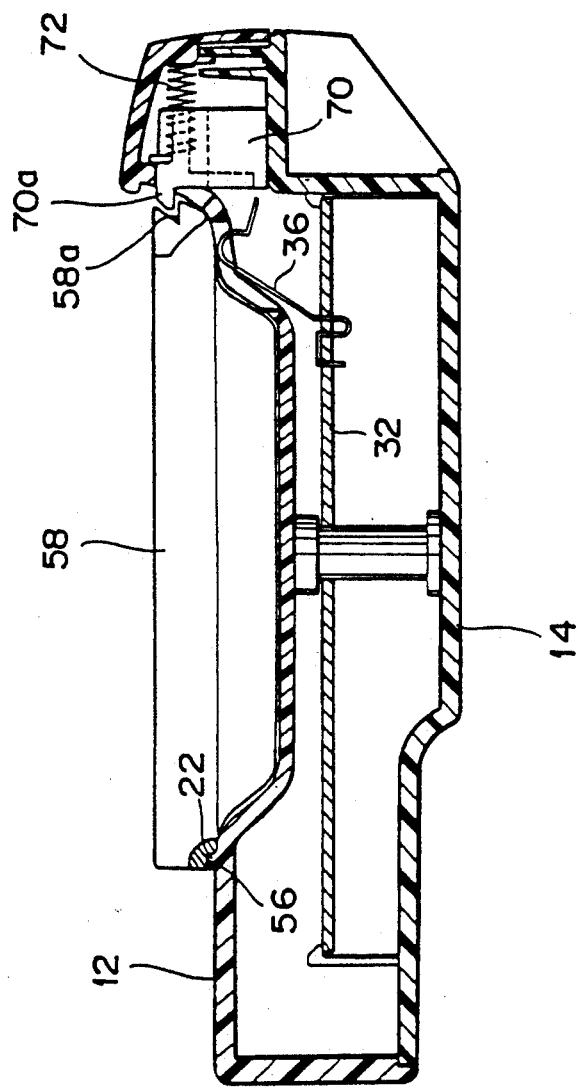
FIG. 15 is a cross-sectional view of the third embodiment of FIG. 14 together with its battery pack.

When the battery pack holder 70 is held in place by the guide rails 74 and the coil spring 72 is inserted onto the guide pin 70b, the holder 70 is pressed into a protruding position shown in FIG. 15. The large-capacity battery pack 58 is mounted on the battery charger 1 in that state. This allows the pawl 70a of the battery pack holder 70 to engage with the concave portion 58a of the battery pack 58, thereby keeping the battery pack in place. The convex portion 22 engaging with the concave portion 56 of the large-capacity battery pack 58 effectively inhibits the elastically exerted force of the charging terminals 36 from dislodging the battery pack from the battery charger 10. Held in place in the above manner, the large-capacity battery pack 58 is charged reliably as a discrete unit detached from the portable telephone set. The same workings of the above setup also apply to the small-capacity battery pack 52.

Figure 17:
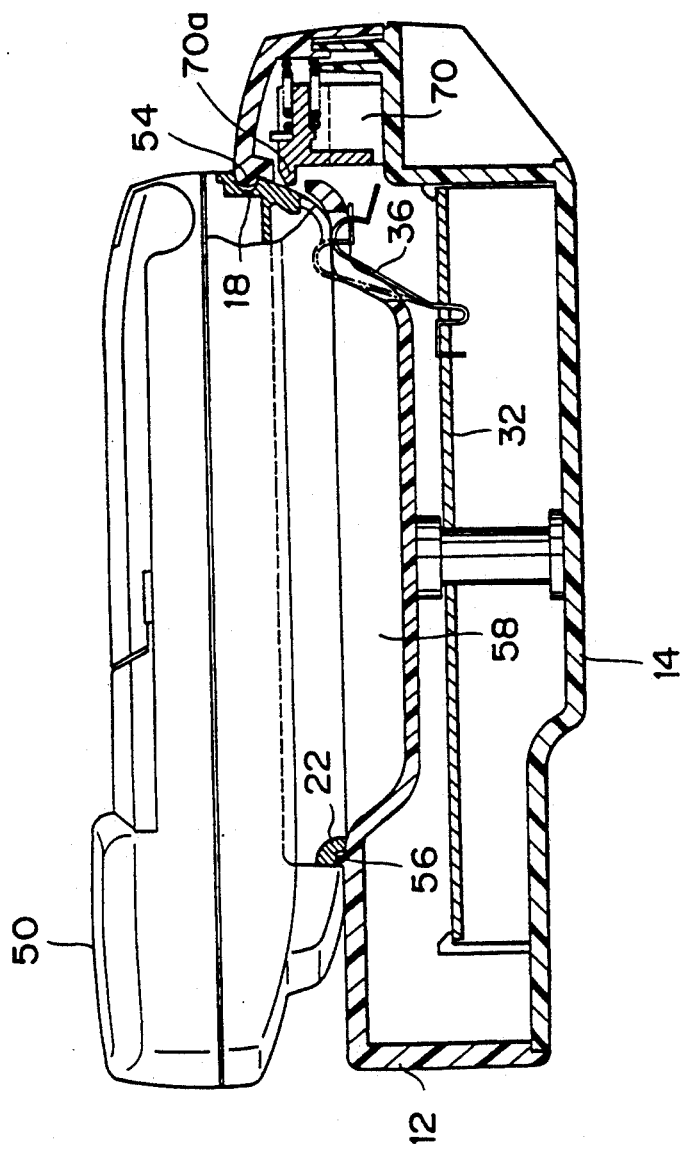
FIG. 17 is a cross-sectional view of the third embodiment of FIG. 14 as it is loaded with a portable telephone set.

FIG. 17 illustrates the mode in which the large-capacity battery pack 58 loaded in the portable telephone set 50 is charged by the third embodiment. In this mode, the battery pack holder 70 moves to its retracted position as it is pushed by the portable telephone set 50. The convex portion 18 of the upper case 12 engages with the concave portion 54 of the portable telephone set 50 and the convex portion 22 of the upper case 12 with the concave portion 56 of the large-capacity battery pack 58. This securers the portable telephone set 50 to the battery charger 10, allowing the large-capacity battery pack 58 to be charged.

Figure 18:
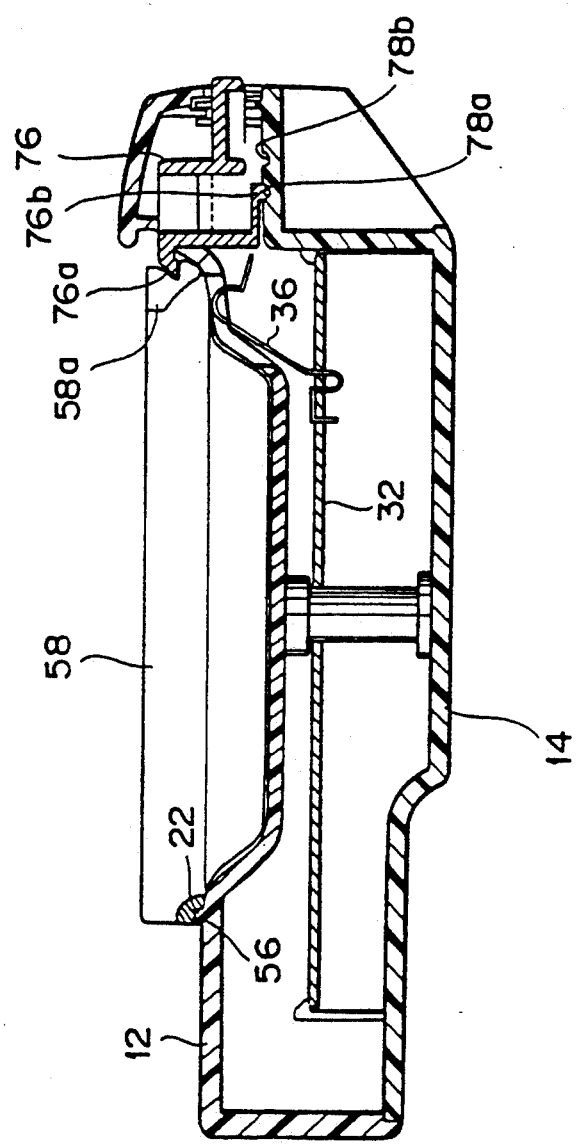
FIG. 18 is a cross-sectional view of a fourth embodiment of the invention as it is equipped with a battery pack holder.
Figure 19:
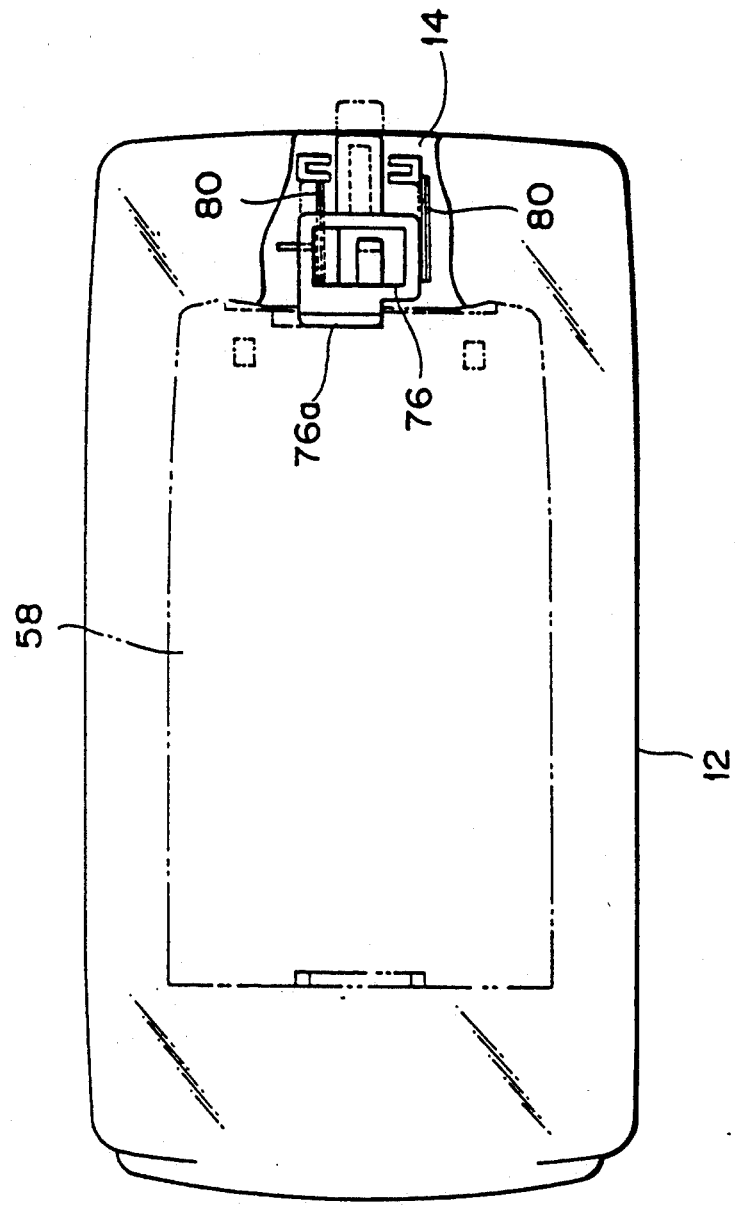
FIG. 19 is a partially broken plan view of the fourth embodiment of FIG. 18.

FIGS. 18 and 19 are a cross-sectional view and a partially broken plan view, respectively, of the fourth embodiment of the invention as it is equipped with a battery pack holder 76. The battery pack holder 76 has a pawl 76a and a projection 76b, with the pawl 76a designed to engage with the concave portion 58a of the large-capacity battery pack 58. The relocation of the battery pack holder 76 is guided by a pair of guide rails 80 provided on the lower case 14.

Two concave portions 78a and 78b are formed on the lower case 14 of the battery charger 10. The projection 76b of the battery pack 76 engaging with the concave portion 78a holds the battery pack holder 76 in its protruding position as shown in FIG. 18. The pawl 76a engaging with the concave portion 58a inhibits the elastically exerted force of the charging terminals 36 from dislodging the large-capacity battery pack 58. When the battery pack holder 76 is pushed in until its projection 76b engages with the concave portion 78b, the battery pack holder 76 is held in its retracted position. Placed in that position, the battery pack holder 76 charges reliably the small-capacity battery pack 52 or large-capacity battery pack 58 attached to the portable telephone set 50.

As described, the battery charger according to the invention accommodates the portable telephone set loaded with its battery pack in a simple yet secure manner. This allows the battery charger to tap both the household outlet and the onboard vehicle power outlet for easy and unfailing charging of large- and small- capacity battery packs. When combined with the battery pack holder, the battery charger is capable of charging the battery pack as a discrete unit detached from the portable telephone set.

While preferred embodiments of the invention have been described using specific terms, such description is for illustrative purposes only, and it is to be understood that changes and variations may be made without departing from the spirit or scope of the following claims.

What is claimed is:

1. A battery charger for use with a portable telephone set and for charging a first battery pack of a large capacity and a second battery back of a small capacity used by said portable telephone set, said first battery pack having a convex portion at the bottom thereof, said portable telephone set having a concave portion at one end thereof, said first battery pack and said second battery pack each having a concave portion common to the two packs, said battery charger comprising:
   a case having a concave portion on the top thereof, a first convex portion at one end of said top and a second convex portion at the other end of said top, said concave portion of said top being structured to engage with said convex portion of said first battery pack, said first convex portion being structured to engage with said concave portion of said portable telephone set, said second convex portion being structured to engage with the common concave portion of said first battery pack and said second battery pack;
   a printed circuit board included in said case and containing charging circuits;
   a pair of charging terminals projecting from said top of said case and connected to said charging circuits of said printed circuit board; and
   a battery pack holder removably attached to said case to hold from above any one of said first battery pack and said second battery pack selectively mounted on said case in order to keep the selected battery pack in place.

2. A battery charger for use with a portable telephone set according to claim 1, wherein said battery pack holder includes:
   a mounting portion for allowing said battery pack holder to be mounted onto said case;
   a body portion shaped to follow the cross-sectional contour of that position of said case in which said battery pack holder is mounted;
   a hinge provided as a continuation of said body portion;
   a concave portion for engaging with said first convex portion of said case; and
   a holding portion for holding said first battery pack and said second battery pack in place.

3. A battery charger for use with a portable telephone set according to claim 2, further comprising holding means for holding said battery pack holder in inactive state while said concave portion of said battery pack holder attached to said case is disengaged from said first convex portion of said case, said battery pack holder being bent around said hinge.

4. A battery charger for use with a portable telephone set according to claim 1, wherein said battery pack holder includes:
   a concave portion for engaging with said first convex portion of said case; and
   a pawl for engaging with said first battery pack and said second battery pack.

5. A battery charger for use with a portable telephone set according to claim 1, wherein said case includes:
   a pair of guide rails for guiding the relocation of said battery pack holder; and
   actuating means for actuating said battery pack holder positioned in said case in such a manner that said battery pack holder protrudes from and retracts into said case as needed.

6. A battery charger for use with a portable telephone set according to claim 1, wherein said battery pack holder has a pawl and a projection for engaging with said first battery pack holder and said second battery pack holder, and wherein said case has a pair of guide rails for guiding the relocation of said battery pack holder, and a pair of concave portions for selectively engaging with said projection of said battery pack holder so that said battery pack holder will be held in place in any one of protruding and retracted positions.

* * * * *